(12) United States Patent
Maquin et al.

(10) Patent No.: US 7,713,895 B2
(45) Date of Patent: May 11, 2010

(54) SILICO-SODO-CALCIC GLASS COMPOSITION

(75) Inventors: Bertrand Maquin, Paris (FR); Lucien Fosse, Etalondes (FR)

(73) Assignee: Saint-Gobain Emballage, Courbevoie (FR)

( * ) Notice: Subject to any disclaimer, the term of this patent is extended or adjusted under 35 U.S.C. 154(b) by 817 days.

(21) Appl. No.: 10/587,901

(22) PCT Filed: Jan. 27, 2005

(86) PCT No.: PCT/FR2005/050048

§ 371 (c)(1),
(2), (4) Date: Dec. 14, 2006

(87) PCT Pub. No.: WO2005/075368

PCT Pub. Date: Aug. 18, 2005

(65) Prior Publication Data

US 2007/0155610 A1   Jul. 5, 2007

(30) Foreign Application Priority Data

Jan. 30, 2004   (FR) .................................. 04 00922

(51) Int. Cl.
*C03C 3/087* (2006.01)
(52) U.S. Cl. .......................................... 501/70; 501/71
(58) Field of Classification Search .................... 501/70, 501/71
See application file for complete search history.

(56) References Cited

U.S. PATENT DOCUMENTS

| 5,061,659 A | 10/1991 | Ciolek et al. |
| 5,558,942 A * | 9/1996 | Itoh et al. ................... 428/426 |
| 2001/0034295 A1 * | 10/2001 | Seto et al. ..................... 501/71 |
| 2004/0110625 A1 * | 6/2004 | Smith et al. ................... 501/72 |

FOREIGN PATENT DOCUMENTS

| EP | 0 619 274 | 10/1994 |
| EP | 0 653 385 | 5/1995 |
| JP | 52 47812 | 4/1977 |
| WO | 00 07952 | 2/2000 |
| WO | 02 066388 | 8/2002 |

* cited by examiner

*Primary Examiner*—Anthony J Green
*Assistant Examiner*—Elizabeth A Bolden
(74) *Attorney, Agent, or Firm*—Oblon, Spivak, McClelland, Maier & Neustadt, L.L.P.

(57) ABSTRACT

The invention relates to a clear glass composition of the soda-lime-silicate type that absorbs ultraviolet radiation, which composition includes optical absorbents below in contents varying within the following weight limits:

Figure 1:
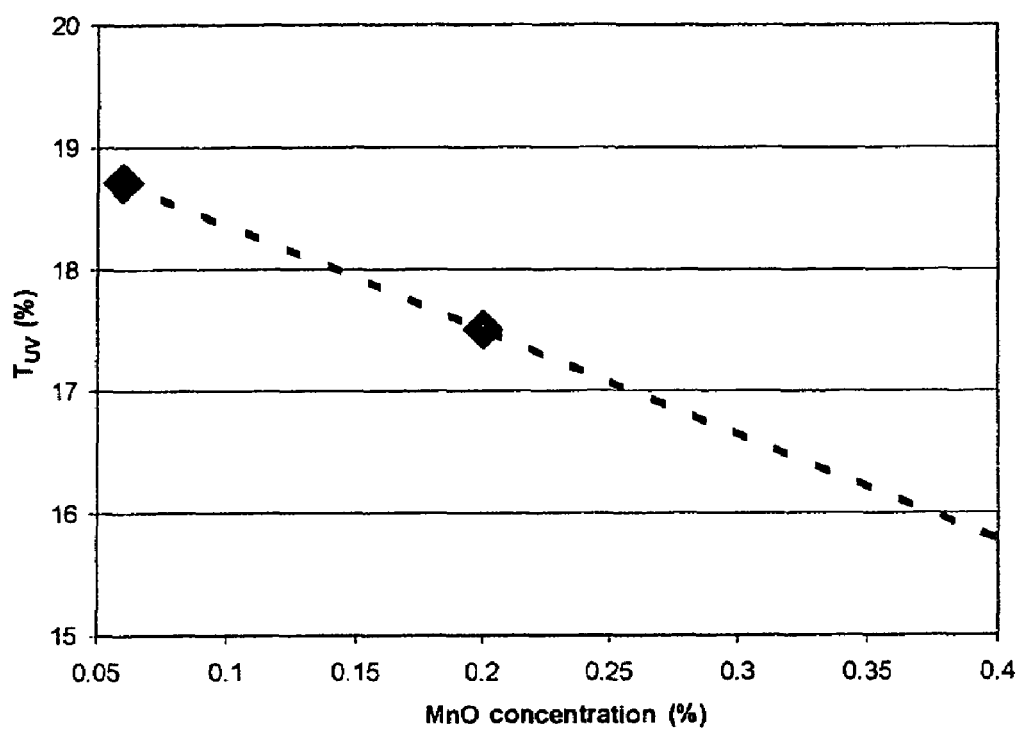

| $Fe_2O_3$ (total iron) | 0.01 to 0.15% |
| $V_2O_5$ (total vanadium) | 0.11 to 0.40% |
| MnO (total manganese) | 0.05 to 0.40% | and which has, for a thickness of 3 mm, an ultraviolet transmission not exceeding 40% and chromatic coordinates (a*, b*) of between −3 and 3.

It also relates to glass hollowware or flat articles, obtained from the aforementioned composition.

20 Claims, 1 Drawing Sheet

SILICO-SODO-CALCIC GLASS COMPOSITION

The present invention relates to a soda-lime-silicate glass composition intended for the production of articles, particularly glass hollowware, or else those in the form of sheets of flat glass, the said composition giving these said articles the following properties: low transmission of ultraviolet radiation, high transmission of visible radiation, and neutral colour.

Although the invention is not limited to such an application, it will be more particularly described with reference to applications in the field of glass hollowware, such as bottles, flasks or pots.

Ultraviolet radiation (UV), in particular solar radiation, may interact with many liquids and sometimes degrade their quality. This is for example the case with certain consumable liquids, including certain wines, spirits, beer or olive oil, the colour and the taste of which may be impaired, or else certain perfumes, the aroma of which may be modified. There is therefore a real need, both in the agri-foodstuffs industry and the cosmetics industry, for glass containers capable of absorbing most of the ultraviolet radiation.

Glass containers meeting this constraint are extremely commonplace, but in general they are strongly coloured. Wine and beer are for example often contained in brown or green bottles, such colorations being obtained by the addition of pigments such as chromium oxide or sulphides of transition elements, such as iron sulphides. However, these tinted containers have the drawback of masking the coloration of the liquid that they contain.

In certain cases, it may be desirable, mainly for aesthetic reasons, to be able to fully appreciate the coloration of the contents, and therefore to have containers of both a high light transmission and a neutral tint.

Solutions intended to solve this technical problem have been described, these generally consisting in adding to a glass composition oxides that preferably absorb ultraviolet radiation, such as cerium oxide or vanadium oxide.

Publication U.S. Pat. No. 6,407,021 thus discloses containers made of glass whose composition comprises 0.2 to 1 wt % cerium oxide expressed in $CeO_2$ form and 0.01 to 0.08 wt % manganese oxide expressed in $MnO_2$ form. The latter oxide is added so as to compensate for the green-yellow tint due to the iron oxide contained in the composition with a content of at least 0.01%.

Application JP 11-278863 also discloses the use of cerium oxide, in mass content between 0.1 and 1%, and also cobalt and, optionally, selenium oxide, the addition of the latter two compounds also having the effect of "decolorizing" the glass, that is to say compensating for the yellow tint provided by the cerium.

The main drawback of cerium oxide is its relatively low efficiency in absorbing ultraviolet radiation, which means that it is often necessary to use contents of greater than 0.5 wt %. Furthermore, a person skilled in the art knows that cerium, alone or in combination with certain compounds such as vanadium oxide, gives the glass "solarization" properties, this term meaning changes in tint undergone by the glass when it is exposed to high-energy radiation, such as ultraviolet radiation.

Vanadium oxide is a useful substitute for cerium oxide, as its absorptivity for UV radiation is much greater than that of cerium oxide. However, it may exhibit an undesirable green coloration, which means the addition of "decolorizing" oxides.

Application WO 00/35819 discloses the use of vanadium oxide and phosphorus oxide, the vanadium oxide content being less than 0.3% expressed as a percentage by weight.

Application WO 02/066388 discloses compositions containing small amounts of vanadium and manganese oxides, with contents of between 0.04 and 0.10% and between 0.04 and 0.13% respectively, the $V_2O_5$/MnO ratio being between 0.6 and 1.7. However, and even though manganese oxide is described as acting as a bleacher, especially through the $Mn^{3+}$ ion, the glasses exemplified in that document have dominant wavelengths, generally of around 560 to 570 nm, demonstrating a slightly yellow or amber tint. The absorption of ultraviolet by the glasses disclosed in the examples is characterized by a transmission of between 1 and 7% at a wavelength of 330 nm.

Application JP-A-52-47812 also discloses glasses containing small amounts of vanadium oxide and manganese oxide, but it considers it to be necessary to add cerium oxide (with a content of at least 0.15%) and selenium oxide (at least 0.004%, i.e. 40 ppm, for this colouring compound is a high content).

The object of the present invention is to propose a soda-lime-silicate glass composition that can be used to form glass hollowware possessing a low ultraviolet transmission, a high transmission in the visible wavelengths and a neutral tint, so that the appearance of their contents can be seen perfectly, while still protecting the organoleptic characteristics of the said contents.

These objects are achieved according to the present invention by the glass composition which includes the following optical absorbents in contents varying within the following weight limits:

| | |
|---|---|
| $Fe_2O_3$ (total iron) | 0.01 to 0.15%; |
| $V_2O_5$ | 0.11 to 0.40%; |
| MnO | 0.05 to 0.40%, | the glass having the said composition being furthermore characterized, for a thickness of 3 mm, by an ultraviolet transmission ($T_{UV}$) of less than 40% and a neutral colour defined by the calorimetric coordinates a* and b*, each of which is between −3 and +3.

$V_2O_5$ and MnO represent the total contents of vanadium oxide and manganese oxide respectively.

The ultraviolet transmission ($T_{UV}$) of the glass according to the invention is calculated for a thickness of 3 mm, based on an experimental spectrum measured, using the solar spectral distribution defined by Parry Moon (J. Franklin Institute, Volume 230, pp 583-617, 1940) for an air mass 2 and within the wavelength range from 295 to 380 nm.

The $T_{UV}$ of the glass according to the invention preferably does not exceed 30%, especially does not exceed 25%, or even 20%.

The glass falling within the context of the present invention is glass of neutral tint, that is to say it has a transmission curve which varies hardly with the visible wavelength.

In the CIE (Commission Internationale de l'Eclairage) system, bodies that are ideally neutral (or grey) do not possess a dominant wavelength and their excitation purity is zero. By extension, the body is generally accepted as being grey if its curve is relatively flat in the visible range but does have, however, weak absorption bands that allow a dominant wavelength and a low, but non-zero purity to be defined.

The glass according to the invention is defined hereafter by its chromatic coordinates L*, a* and b* calculated from an experimental spectrum for glass specimens 3 mm in thickness, taking as reference the "CIE 1931" reference observer and the standard illuminant C, both being defined by the CIE. Using this notation, a body having a neutral coloration is characterized by a pair of parameters (a*,b*) close to (0,0). The glass according to the invention is defined as having the following:

a* varies from −3 to +3
b* varies from −3 to +3.

Glass having an even greater neutrality is preferably characterized by an a* value of preferably between −2 and +2, especially between −1 and +1, and by a b* value of preferably between 0 and +3. The slightly positive b* values correspond in fact to glass having a slight yellow coloration, which ensures better colour rendering than a bluish coloration characterized by negative b* values.

The use of the aforementioned optical absorbents within the limits of the invention makes it possible to give the glass the desired properties and also to optimize its optical and energy properties.

The action of the absorbents taken individually is in general well described in the literature.

The presence of iron in a glass composition may result from the batch materials, as impurities or from deliberate addition for the purpose of colouring the glass. It is known that iron exists in the structure of the glass in the form of ferric ions ($Fe^{3+}$) and ferrous ions ($Fe^{2+}$). The presence of $Fe^{3+}$ ions gives the glass a slight yellow coloration and allows the ultraviolet radiation to be absorbed. The presence of $Fe^{2+}$ ions gives the glass a more pronounced green-blue coloration and causes infrared radiation to be absorbed. Increasing the content of iron in both its forms increases the absorption of radiation at the extremes of the visible spectrum, this effect taking place to the detriment of the light transmission.

In the present invention, the total iron content in the composition is between 0.01 and 0.15%, preferably between 0.02 and 0.10%. An iron content of less than 0.01% means that the batch materials must have a high degree of purity, which results in too high a cost of the glass for use as bottles or flasks. Above 0.15% iron, the glass composition has too low a transmission in the visible range and an excessively pronounced green tint.

Vanadium oxide exists in three oxidation states in the glass. The $V^{5+}$ ion is responsible for ultraviolet absorption, whereas the $V^{4+}$ and $V^{3+}$ ions give an undesirable green coloration. Within the context of the present invention, and so as to obtain the desired UV transmission values, the total vanadium oxide content expressed in $V_2O_5$ form is necessarily not less than 0.11%, preferably not less than 0.13%, or even 0.15 or 0.16%, especially not less than 0.20%, and even more preferably not less than 0.25%. For reasons essentially due to the high cost of vanadium oxide, the content of the latter is preferably less than 0.40%, especially less than 0.30% and even less than 0.28%. Vanadium oxide contents of between 0.11 and 0.17% generally give glass having a $T_{UV}$ of around 20 to 40%, whereas amounts that are greater than or equal to 0.17%, or even 0.19%, are often needed to ensure a $T_{UV}$ of less than 20%. A vanadium oxide content of between 0.19 and 0.22% aims in this case to be particularly suitable.

Manganese oxide exists in the glass in oxidized form ($Mn^{3+}$) and reduced form ($Mn^{2+}$). Whereas the reduced form produces only a very slight coloration, $Mn^{3+}$ ions give the glass containing them an intense pink or violet coloration. As is well known to those skilled in the art, this form is particularly useful for compensating for the green tint attributable to iron oxide and, in the case of the present invention, to vanadium oxide. The inventors have nevertheless demonstrated an additional and unexpected beneficial effect of manganese oxide on the UV transmission when this is used in combination with vanadium oxide. It has been discovered that the addition of manganese oxide makes it possible to reduce the vanadium oxide content needed to achieve a given $T_{UV}$, or even to reduce the $T_{UV}$ of a glass containing a given amount of vanadium oxide. Consequently, the glass according to the invention has an MnO content (representing the total content of manganese oxide) not less than 0.05%, preferably not less than 0.09%, or even 0.10%, and even more preferably not less than 0.13%. For the reasons mentioned above, the MnO contents are sometimes advantageously greater than 0.15%, especially greater than 0.18% and even greater than 0.20%. To avoid the appearance of an undesirable pink or violet coloration, the MnO content is kept at 0.40% or less, preferably 0.25% or less, or even 0.22% or less.

The inventors have also discovered that the optimized proportion of MnO to be introduced relative to the amount of vanadium oxide in order to achieve a neutral coloration varies according to the method employed for adding the optical absorbents, and especially according to the temperature which this method is carried out at. When the addition of the vanadium and manganese oxides or of manganese oxide alone is carried out in the melting furnace using the "tank coloration" method, usually within a temperature range from 1400° C. to 1500° C., the ratio R1, defined by the weight content of manganese oxide relative to the weight content of vanadium oxide, is preferably chosen to be between 1.2 and 1.8, and especially to be not less than 1.5. When the addition of these oxides or of manganese oxide alone is carried out in a feeder for transporting the glass from the furnace to the forming devices, usually at temperatures of around 1200° C. to 1300° C., this ratio R1 is preferably chosen to be not less than 0.5, or even 0.8, but to not exceed 1.2, or even 1.0. Especially in the case of feeder addition of the manganese and vanadium oxides or of manganese oxide alone, the combination of a vanadium oxide content of between 0.19 and 0.22% with a manganese oxide content of between 0.13 and 0.18% is particularly preferred. In general, and irrespective of the way in which the manganese and vanadium oxides are introduced, the ratio R1 must be increased if the glass has too low an a* value and must be decreased if the glass has too high an a* value.

Cobalt oxide produces an intense blue coloration and so reduces the light transmission. Its role in the present invention is to compensate for any yellow component caused by an excessive $Mn^{3+}$ ion content. The amount must therefore be perfectly controlled in order to make both the light transmission and the coloration compatible with the use to which the glass is intended. According to the invention, the cobalt oxide content preferably does not exceed 0.0025%, preferably does not exceed 0.0020%, or does not exceed 0.0015% even does not exceed 0.0010%. This is because above 0.0025% the light transmission of the glass becomes too low, and the tint becomes too blue.

Within the context of the present invention, a particularly preferred composition, in particular when vanadium and manganese oxides are introduced in the tank, includes the following optical absorbents in a content varying within the following weight limits:

| | |
|---|---|
| Fe$_2$O$_3$ | 0.02 to 0.08% |
| V$_2$O$_5$ | 0.16 to 0.25% |
| MnO | 0.20 to 0.30% |
| CoO | 0 to 0.0020%. |

Another preferred embodiment, in particular when the vanadium and manganese oxides or the manganese oxide alone, are added in the feeder, consists in choosing the following composition ranges:

| | |
|---|---|
| Fe$_2$O$_3$ | 0.02 to 0.08% |
| V$_2$O$_5$ | 0.19 to 0.22% |
| MnO | 0.13 to 0.18% |
| CoO | 0 to 0.0010%. |

As a general rule, it is difficult to predict the optical and energy properties of a glass when it contains several optical absorbents. This is because such properties result from a complex interaction between the various absorbents, the behavior of which is furthermore dependent on their oxidation state. This is particularly so in the case of compositions according to the invention, which contain at least three oxides existing in several valence states.

In the present invention, the choice of optical absorbents, their content and their oxidation/reduction state are key factors for obtaining the required optical properties.

In particular, the redox state defined by the ratio of the molar content of ferrous oxide (expressed as FeO) to the molar content of total iron (expressed as Fe$_2$O$_3$), is less than 0.2, preferably less than or equal to 0.1.

The redox state is generally controlled using oxidizing agents, such as sodium sulphate, and reducing agents, such as coke, the relative contents of which are adjusted in order to obtain the desired redox state. The oxidized forms of vanadium and manganese may also fulfill an oxidizing role with respect to ion oxide, which makes it particularly complicated, or even impossible, to predict the optical properties of a glass resulting from a given batch mix.

The composition according to the invention makes it possible to obtain a glass that preferably has an overall light transmission LT$_C$ calculated, for a thickness of 3 mm, from an experimental spectrum, taking the "CIE 1931" reference observer and the standard illuminant C as reference, that is not less than 70%, especially not less than 80%, thereby allowing the desired transparency effect to be obtained.

The term "soda-lime-silicate" is used here in the widest sense and relates to any glass composition consisting of a glass matrix that comprises the following constituents (in percentages by weight):

| | |
|---|---|
| SiO$_2$ | 64-75% |
| Al$_2$O$_3$ | 0-5% |
| B$_2$O$_3$ | 0-5% |
| CaO | 5-15% |
| MgO | 0-10% |
| Na$_2$O | 10-18% |
| K$_2$O | 0-5% |
| BaO | 0-5%. |

It should be mentioned here that the soda-lime-silicate glass composition may include, apart from the inevitable impurities contained in particular in the batch materials, a small proportion (up to 1%) of further constituents, for example agents for promoting the melting or refining of the glass (SO$_3$, Cl, Sb$_2$O$_3$, As$_2$O$_3$), or coming from possible addition of recycled cullet into the batch mix.

In the glass according to the invention, the silica content is generally maintained within narrow limits for the following reasons. Above 75%, the viscosity of the glass and its ability to devitrify increase greatly, which makes it more difficult to melt and flow on the bath of molten tin. Below 64%, the hydrolytic resistance of the glass rapidly decreases and the transmission in the visible also decreases.

Alumina (Al$_2$O$_3$) plays a particularly important role in the hydrolytic resistance of the glass. When the glass according to the invention is intended to form hollowware containing liquids, the alumina content is preferably not less than 1%.

The alkali metal oxides Na$_2$O and K$_2$O facilitate the melting of the glass and allow its viscosity to be adjusted at high temperatures so as to keep it close to that of a standard glass. K$_2$O may be used up to 5%, as the problem of the high cost of the composition rises above this content. Moreover, the increase in percentage of K$_2$O can be accomplished, essentially, only to the detriment of Na$_2$O, which contributes to increasing the viscosity. The sum of the Na$_2$O and K$_2$O contents, expressed as percentages by weight, is preferably not less than 10% and advantageously does not exceed 20%. If the sum of these contents is greater than 20% or if the Na$_2$O content is greater than 18%, the hydrolytic resistance is greatly reduced.

Alkaline-earth oxides allow the viscosity of the glass to be adapted to the production conditions.

MgO may be used up to about 10% and its omission may be at least partly compensated for by an increase in the Na$_2$O and/or SiO$_2$ content. Preferably, the MgO content is less than 5% and particularly advantageously less than 2%, which has the effect of increasing the infrared absorptivity without impairing the transmission in the visible. Low MgO contents furthermore make it possible to reduce the number of batch materials needed for melting the glass.

BaO allows the light transmission to be increased and can be added to the composition in a content of less than 5%.

BaO has a much less pronounced effect than CaO and MgO on the viscosity of the glass, and the increase in its content is essentially accomplished to the detriment of the alkali metal oxides, of MgO and above all of CaO. Any BaO increase helps to increase the viscosity of the glass at low temperatures. Preferably, the glasses according to the invention contain no BaO.

Apart from complying with the limits defined above as regards the variation in the content of each alkaline-earth metal oxide, it is preferable, in order to achieve the desired transmission properties, to limit the sum of the weight percentages of MgO, CaO and BaO to a value of 15% or less.

The composition according to the invention may furthermore include additives, for example agents that absorb in certain spectral regions, such as oxides of transition elements (such as Cr$_2$O$_3$, TiO$_2$, NiO, CuO etc.) or rare earth oxides (such as CeO$_2$, La$_2$O$_3$, Nd$_2$O$_3$, Er$_2$O$_3$ etc.) or else colouring agents in the elemental state (Se, Ag, Cu). The content of such additives is less than 2%, preferably less than 1%, and even less than 0.5%, or indeed zero (apart from inevitable impurities). It is particularly preferable for the glass according to the invention to contain no rare earth oxides, and especially no neodymium oxide, which is extremely expensive, and/or no cerium oxide, which may cause glass with a low iron content to suffer a solarization effect, the glass becoming brown under the action of high-energy radiation, such as UV radiation. The selenium content is also advantageously zero, this oxide having a strong tendency to volatilize during melting of the glass, requiring expensive decontamination equipment.

The glass composition according to the invention is able to be melted under the production conditions for glass intended for forming hollowware or flat articles using the pressing, blowing or moulding techniques, or even drawing, rolling or floating techniques. Melting generally takes place in flame-fired furnaces, optionally provided with electrodes for heating the glass in the bulk, by passing an electric current between the two electrodes. To facilitate the melting operation, and especially to make the latter mechanically advantageous, the glass composition advantageously has a temperature corresponding to a viscosity $\eta$ such that log $\eta=2$ that is less than 1500° C. Also preferably, the temperature corresponding to the viscosity $\eta$ such that log $\eta=3.5$ (denoted by $T(\log \eta=3.5)$) and the liquidus temperature, (denoted by $T_{liq}$), satisfy the equation:

$$T(\log \eta=3.5)-T_{liq}>20° C.$$

and better still:

$$T(\log \eta=3.5)-T_{liq}>50° C.$$

The addition of optically absorbent oxides may be carried out in the furnace (the process is then referred to as "tank coloration") or in the feeders that transport the glass between the furnace and the forming installations (the process is then referred to as "feeder coloration"). Feeder coloration requires a particular addition/mixing installation, but does have, however, advantages as regards flexibility and reactivity that are particularly desirable when the production of an extended range of particular optical properties and/or tints is required. In the particular case of feeder coloration the optical absorbents are incorporated in glass frits or agglomerates, which are added to a clear glass in order to form, after homogenization, a glass according to the invention. Different frits can be employed for each added oxide, but it may be advantageous in certain cases to use a single frit containing all the useful optical absorbents. It is desirable for the vanadium oxide content or the manganese oxide content in the frits or agglomerates employed to be between 15 and 25% so as not to exceed levels of frit dilution in the molten glass greater than 2%. This is because above 2% is becomes difficult for the molten glass to be suitably homogenized, while still maintaining high output compatible with a low overall economic cost of the process. It has also been observed that the oxidation state of the vanadium and of the manganese within the frits plays a not insignificant role in determining the redox state of the final glass. Oxidized frits, therefore those containing vanadium or manganese ions predominantly in their highest oxidation state, allow the preferred redox states after mixing to be obtained more easily, and consequently it is preferable to employ such frits. Likewise, an oxidizing character of the flames produced above the glass melt contained in the feeder is preferred, it being possible to achieve this by adjusting the inflow of oxidizer relative to the fuel, such that the oxidizer is supplied superstoichiometrically. When the oxidizer is oxygen ($O_2$) and the fuel is methane ($CH_4$), the $O_2/CH_4$ molar ratio is preferably not less than 2, especially not less than 2.1 or even 2.2. According to a preferred embodiment, only vanadium oxide is added in the tank, the manganese oxide being added in the feeder, in the form of frits or agglomerates.

The present invention will be more clearly understood on reading the detailed description below of non-limiting illustrative examples and the figures appended hereto:

Table 1 illustrates various glass compositions according to the invention;

Table 2 illustrates the effect of the ratio R1 of the weight content of manganese oxide to the weight content of vanadium oxide;

FIG. 1 illustrates the additional effect of manganese oxide on the $T_{UV}$ when it is employed in combination with vanadium oxide.

Examples of glass compositions given below (in Tables 1 and 2) allow the advantages associated with the present invention to be more fully appreciated.

These examples indicate the values of the following optical properties calculated, for a glass thickness of 3 mm, from experimental spectra:

the ultraviolet transmission ($T_{UV}$) calculated using the solar spectral distribution defined by Parry Moon (J. Franklin Institute, Volume 230, pp 583-617, 1940) for an air mass 2 and within the wavelength range from 295 to 380 nm;

the overall light transmission factor ($LT_C$), calculated between 380 and 780 nm, and also the chromatic coordinates L*, a* and b*. These calculations were made using the illuminant C as defined by the ISO/CIE 10526 standard and the CIE 1931 calorimetric reference observer, as defined by the ISO/CIE 10527 standard.

Also indicated in Tables 1 and 2 are:

the weight contents of iron oxide, vanadium oxide, manganese oxide and cobalt oxide;

when it was measured, the redox state defined as the molar ratio of FeO to the total iron expressed in $Fe_2O_3$ form. The total iron content was measured by X-ray fluorescence and the FeO content was measured by wet chemistry;

the ratio R1, equal to the mass content of manganese oxide compared to the mass content of vanadium oxide.

Each of the compositions given in Tables 1 and 2 was produced from the following glass matrix, the contents of which are given in percentages by weight, the composition being corrected as regards silica in order to accommodate the total content of colouring agents added:

| | |
|---|---|
| $SiO_2$ | 71.0% |
| $Al_2O_3$ | 1.40% |
| CaO | 12.0% |
| MgO | 0.1% |
| $Na_2O$ | 13.0% |
| $K_2O$ | 0.35%. |

Glass compositions 1 to 8 according to the invention, described in Table 1 were prepared by adding optical absorbents using a tank coloration method. They illustrate the important effect of vanadium oxide coupled with manganese oxide on the $T_{UV}$. Comparative Example 1 is a standard clear glass composition used both for hollow glassware and for flat glass. Its $T_{UV}$ which exceeds 90%, is lowered to about 40% by adding 0.11% vanadium oxide, and then down to 20% by adding larger amounts. Examples 6, 7 and 8 illustrate the effect of cobalt oxide, which serves to adjust the b* value in order to obtain, if desired, a slightly bluish tint. It may also be noted that these compositions, which have an R1 ratio close to 1.5, are more neutral than compositions 3, 4 and 5, which have an R1 ratio close to 1. The highest neutrality is characterized in particular by a* values closer to zero. This point illustrates the importance within the context of the present invention, of the R1 ratio. Example 1 shows that the $V_2O_5$ content of the glass compositions according to the invention must necessarily not be less than 0.11% in order to obtain an ultraviolet transmission of 40% or less.

TABLE 1

|  | Comparative Example 1 | Ex. 1 | Ex. 2 | Ex. 3 | Ex. 4 | Ex. 5 | Ex. 6 | Ex. 7 | Ex. 8 |
|---|---|---|---|---|---|---|---|---|---|
| $Fe_2O_3$ (%) | 0.02 | 0.04 | 0.09 | 0.09 | 0.06 | 0.06 | 0.02 | 0.06 | 0.06 |
| Redox state | 0.3 | <0.1 | | | | | | | |
| $V_2O_5$ (%) | — | 0.11 | 0.21 | 0.21 | 0.25 | 0.25 | 0.20 | 0.20 | 0.20 |
| MnO (%) | — | 0.15 | 0.06 | 0.20 | 0.25 | 0.25 | 0.30 | 0.30 | 0.30 |
| CoO (%) | — | 0.0011 | — | — | — | 0.0015 | — | 0.0015 | 0.0025 |
| R1 | — | 1.4 | 0.2 | 1.0 | 1.0 | 1.0 | 1.5 | 1.5 | 1.5 |
| $T_{UV}$ (%) | 90.1 | 39.8 | 18.7 | 17.5 | 17.9 | 17.7 | 19.8 | 19.1 | 19.2 |
| $LT_c$ (%) | 92.1 | 85.9 | 86.7 | 85.3 | 85.9 | 82.4 | 83.7 | 83.3 | 79.8 |
| a* | −0.2 | −1.1 | −2.3 | −2.1 | −1.0 | −1.1 | 0.1 | −0.2 | −0.2 |
| b* | 0.1 | 0.5 | 2.3 | 2.6 | 2.9 | 0.8 | 2.7 | 1.2 | −0.5 |

The examples given in Table 2 also illustrate the importance that the R1 ratio can have on the optical properties, depending on the method in which the optically active materials were added.

The two examples given (Comparative Example 2 and Example 9 according to the invention) have the same vanadium oxide, manganese oxide and cobalt oxide contents and are characterized by an R1 ratio close to 1.5, but these oxides were added under different conditions. Whereas this R1 ratio is particularly well suited to the conditions in which the absorbent oxides are added in the furnace, and makes it possible to obtain a particularly neutral glass (Example 9), this same ratio is, in this precise case, poorly suited to the conditions in which the absorbent oxides are added to the feeder, since Comparative Example 2 has a very pronounced purple coloration characterized by very high a* and b* values and a low $LT_C$. In contrast, Example 10, produced by feeder coloration, shows that a much lower R1 ratio is much better suited to this method of coloration.

TABLE 2

|  | Comparative Example 2 | Example 9 | Example 10 |
|---|---|---|---|
| $Fe_2O_3$ (%) | 0.04 | 0.09 | 0.05 |
| Redox state | | | 0 |
| $V_2O_5$ (%) | 0.17 | 0.17 | 0.19 |
| MnO (%) | 0.25 | 0.25 | 0.14 |
| CoO (%) | 0.0010 | 0.0010 | 0.0006 |
| R1 | 1.5 | 1.5 | 0.7 |
| Coloration | Feeder | Furnace | Feeder |
| $T_{uv}$ (%) | 19.8 | 20.0 | 20.6 |
| $LT_c$ (%) | 58.2 | 78.0 | 83.1 |
| a* | 7.8 | 0.3 | −0.2 |
| b* | 3.1 | 1.0 | 2.1 |

FIG. 1 shows the effect of manganese oxide on the $T_{UV}$ of glass compositions containing 0.09% $Fe_2O_3$ and 0.21% $V_2O_5$ (Examples 2 and 3 according to the invention). The beneficial effect of manganese oxide in combination with vanadium oxide may be observed. This beneficial effect is surprising because only the decolorizing effect of manganese oxide, which relies on absorption in the visible range and not in the ultraviolet, was known to those skilled in the art.

The invention claimed is:

1. Glass hollowware formed by molding, pressing or blowing, and comprising a soda-lime-silicate glass composition, comprising the optical absorbents below, in contents varying within the following weight limits:

| $Fe_2O_3$ (total iron) | 0.01 to 0.15% |
|---|---|
| $V_2O_5$ (total vanadium) | 0.11 to 0.40% |
| MnO (total manganese) | 0.05 to 0.40% | wherein the glass has, for a thickness of 3 mm, an ultraviolet transmission $T_{uv}$, measured between 295 and 380 nm, not exceeding 40% and chromatic coordinates (a*,b*) under illuminant C of between −3 and +3.

2. The glass hollowware according to claim 1, wherein the MnO content is not less than 0.10%.

3. The glass hollowware according to claim 1, further comprising cobalt oxide (CoO) in a content not exceeding 0.0025%.

4. The glass hollowware according to claim 1, wherein the $V_2O_5$ content is not less than 0.16%.

5. The glass hollowware according to claim 1, wherein the glass has, for a thickness of 3 mm, an ultraviolet transmission not exceeding 20%.

6. The glass hollowware according to claim 1, wherein the glass has, for a thickness of 3 mm, a chromatic coordinate a* measured under illuminant C of between −2 and 2.

7. The glass hollowware according to claim 1, wherein the glass has, for a thickness of 3 mm, a chromatic coordinate b* measured under illuminant C of between 0 and 3.

8. The glass hollowware according to claim 1, wherein the glass has, for a thickness of 3 mm, a light transmission factor under illuminant C of not less than 70%.

9. The glass hollowware according to claim 1, comprising the coloring agents below in contents varying within the following weight limits:

| $Fe_2O_3$ (total iron) | 0.02 to 0.08% |
|---|---|
| $V_2O_5$ (total vanadium) | 0.16 to 0.25% |
| MnO (total manganese) | 0.20 to 0.30% and |
| CoO | 0 to 0.0020%. |

10. The glass hollowware according to claim 1, comprising the coloring agents below in contents varying within the following weight limits:

| $Fe_2O_3$ (total iron) | 0.02 to 0.08% |
|---|---|
| $V_2O_5$ (total vanadium) | 0.19 to 0.22% |
| MnO (total manganese) | 0.13 to 0.18% and |
| CoO | 0 to 0.0010%. |

11. The glass hollowware according to claim 1, wherein the redox state of the glass does not exceed 0.2.

12. The glass hollowware according to claim 1, including a glass matrix comprising the following constituents (in percentages by weight):

| | |
|---|---|
| $SiO_2$ | 64-75% |
| $Al_2O_3$ | 0-5% |
| $B_2O_3$ | 0-5% |
| CaO | 5-15% |
| MgO | 0-10% |
| $Na_2O$ | 10-18% |
| $K_2O$ | 0-5% and |
| BaO | 0-5%. |

13. A process for manufacturing the glass hollowware according to claim 1 and having an $MnO/V_2O_5$ ratio of between 1.2 and 1.8, the process comprising melting the batch mix in a melting furnace, the said batch mix providing all of the oxides in the composition, and forming said glass to obtain hollowware.

14. A process for manufacturing the glass hollowware according to claim 1 and having an $MnO/V_2O_5$ ratio of between 0.5 and 1.2, the process comprising melting part of the batch mix, transporting the molten glass to the forming device, adding oxides during transporting to said molten glass by glass fits or agglomerates, all of the vanadium and manganese oxides, or the manganese oxide alone, being added to the composition during this step, and forming said glass to obtain hollowware.

15. The process according to claim 14, wherein the $MnO/V_2O_5$ ratio is between 0.8 and 1.2.

16. The glass hollowware according to claim 1, wherein the MnO content is not less than 0.13%.

17. The glass hollowware according to claim 1, wherein the $V_2O_5$ content is between 0.19 and 0.22%.

18. The glass hollowware according to claim 1, wherein the glass has, for a thickness of 3 mm, a chromatic coordinate a* measured under illuminant C of between 1 and 1.

19. The glass hollowware according to claim 1, wherein the glass has, for a thickness of 3 mm, a light transmission factor under illuminant C of not less than 80%.

20. The glass hollowware according to claim 1, wherein the redox state of the glass does not exceed 0.1.

* * * * *